Sept. 18, 1962   L. J. HERSH   3,054,244
GAS-MATERIAL SEPARATOR

Filed March 19, 1959   2 Sheets-Sheet 1

INVENTOR.
LLOYD J. HERSH
BY Pennie Edmonds
Morton Barrows & Taylor
attys

Sept. 18, 1962 L. J. HERSH 3,054,244
GAS-MATERIAL SEPARATOR
Filed March 19, 1959 2 Sheets-Sheet 2

*INVENTOR.*
LLOYD J. HERSH
BY Pennie Edmonds
Morton Barrows Taylor
attys ated Sept. 18, 1962

United States Patent Office 3,054,244
Patented Sept. 18, 1962

3,054,244
GAS-MATERIAL SEPARATOR
Lloyd J. Hersh, Allentown, Pa., assignor to Fuller Company, Catasauqua, Pa., a corporation of Delaware
Filed Mar. 19, 1959, Ser. No. 800,546
21 Claims. (Cl. 55—94)

The present invention is concerned with removal of pollutants from gases, and is more particularly concerned with the removal of dusts and fly ash from hot gases discharged from incinerating zones.

The nuisance and hazards of pollutants and burning ashes which are discharged with the effluent gases from incineration zones generally makes it necessary to remove such pollutants prior to the discharge of the gases to the atmosphere.

Prior arrangements for effecting the separation have included several types of dust collectors, such as cyclones, and of water-spray or other liquid gas washers. However, none of these expedients have been found entirely satisfactory.

In general, the preferred form of apparatus of the present invention comprises a substantially horizontally-disposed cylindrical casing having a gas-material inlet and a gas outlet therein and a longitudinal liquid or water reservoir extending along the lower region thereof. A pair of transverse baffles extend across the cylindrical casing, dividing it into three centrifuging compartments or chambers, each defined at its lower end by the upper level of the liquid in the reservoir. A cylindrical duct is extended substantially coaxially with the cylindrical casing between the two transverse baffles, and communicates with apertures therein to provide direct communication between the two end chambers.

The gas-material inlet is arranged tangentially in the casing in communication with one of the end chambers thereof, and is adapted to receive a stream of gas containing fly ash and other pollutants from a zone such as an incinerator. The chamber at the opposite end of the casing from that which receives the inlet is provided with a fan arranged coaxially opposite the adjacent end of the cylindrical duct, and is provided with suitable driving means such as an electric motor. The gas outlet is arranged in the upper portion of the casing at approximately the middle of the center chamber thereof, and is at least partially defined by a tubular outlet section depending from an upper wall of the casing and terminating at its lower end in an outwardly-extending lip flaring upwardly above the plane of the lower end of the cylindrical duct.

The portion of the casing about and adjacent the gas-material inlet is provided with a surrounding water-jacket, and the wall of the casing forming the inlet is perforated so that water drawn from the reservoir, by means of a pump, or from another suitable source, to the water-jacket may be sprayed into the chamber through the perforations.

The inlet chamber is also provided with a guide vane, arranged adjacent the lower edge of the inlet between the end wall of the casing and the adjacent transverse partition, and extending substantially coaxially with the wall of the casing around to a point adjacent and in close relation with the water level in the lower region of that chamber. The guide vane continues as a scroll substantially coaxially with the wall of the casing to terminate at a point below its initial plane, forming a slot between the ends thereof for the passage of gas in a spiral direction to the center of the compartment. The guide vane is provided with a slot in the lowermost point thereof for the drainage of water or liquid trapped therein.

The fan in the chamber remote from the inlet compartment is preferably of the general type disclosed and claimed in my copending application, Serial No. 626,044, filed December 3, 1956, now Patent No. 2,888,188, having a channelway behind and adjacent each of the main blades. Each of the channelways is open to the atmosphere or other source of relatively cool gas, at its inner end, and is provided additionally with a plurality of rods or bars extending across the channelway adjacent the outer discharge opening thereof, to aid in the dispersion of the gases flowing through the channelways. When a spray of water or other liquid is supplied to the channelways, the bars aid in the dispersion of the liquid into fine particles or fog.

The water reservoir is provided with level control means and a drain or other suitable means in the lower region thereof for removal of water and the accumulated material.

A better understanding of the invention may be derived from the following drawings and description, in which.

Figure 1:
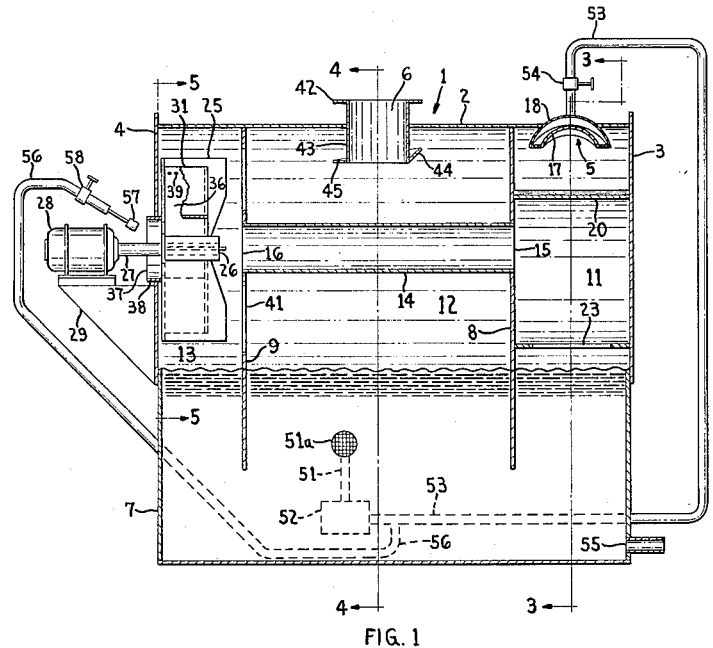
FIG. 1 is a sectional view taken on line 1—1 of FIG. 3, of a gas washer according to the invention.
Figure 2:
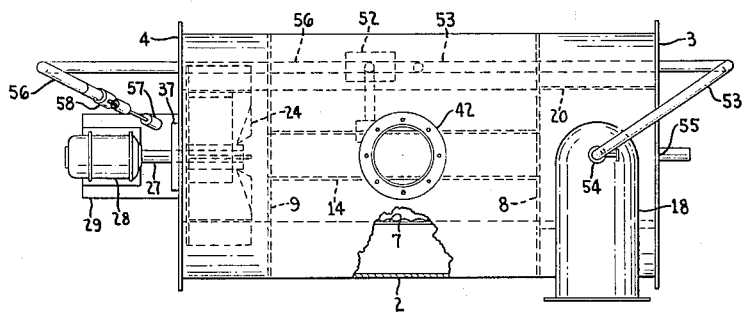
FIG. 2 is a plan view of the gas washer of FIG. 1 with parts in section.
Figure 3:
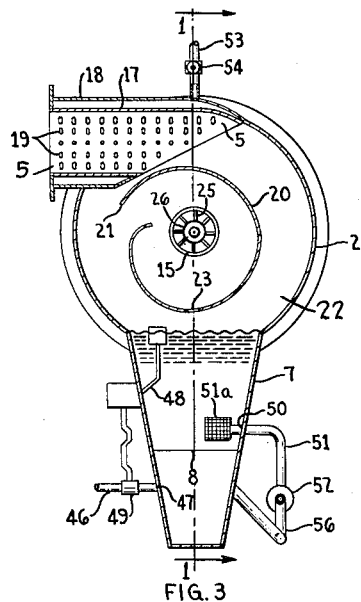
FIG. 3 is a sectional view taken along the lines 3—3 of FIG. 1.

As shown in the figures, the invention, as embodied in a fly ash collector, comprises a substantially horizontally arranged casing 1 comprising a cylindrical wall 2 and a pair of end walls 3 and 4, respectively, and having a gas inlet 5 and a gas outlet 6 therein. An underlying water reservoir 7 communicates with the lower region of the casing throughout substantially the full length thereof. A pair of interior baffles 8 and 9, respectively, are arranged across the casing to divide it into three centrifuging compartments or chambers 11, 12 and 13, respectively, and extend across substantially the full width of the interior of the casing and downwardly into the upper portion of the reservoir. A cylindrical duct 14 is provided between the interior baffles 8 and 9 in substantially coaxial relationship with the cylindrical wall 2, and communicates at its ends with a pair of ports 15 and 16 in baffles 8 and 9, respectively, to provide communication between the end chambers 11 and 13. The gas inlet 5 is provided with an inlet member 17 arranged to enter the upper region of the end chamber 11 tangentially, and is provided with a surrounding water-jacket 18. A plurality of perforations 19 are provided in the wall of the inlet member 18 and are directed inwardly towards its center.

An internal scroll or guide vane 20 is arranged within the chamber 11 and extends from a first end 21 spaced from the wall 2 and adjacent the lower edge of the inlet water-jacket 18, curving downwardly therefrom generally concentrically with the casing wall 2 a point adjacent and slightly above the intersection of the water reservoir 7 with the casing to form a constricted gas passageway with the surface of the water. The guide vane continues in a curved path of progressively decreasing radius to a point adjacent and below the first end 21 thereof, thereby forming a generally spiral gas passage 22 from the tangential inlet to the central portion of the chamber 11 opposite the port 15. The guide vane 20 is also provided with a drain slit 23 in its lower region for the drainage of water or liquid which may be carried over to the interior thereof.

Figure 4:
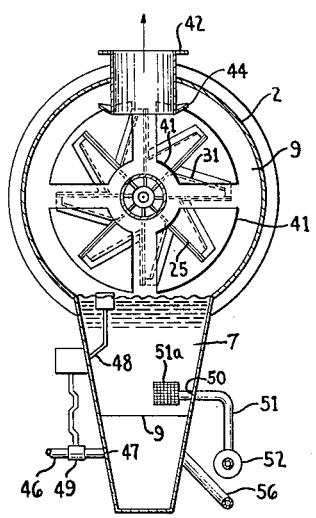
FIG. 4 is a sectional view taken along the lines 4—4 of FIG. 1.
Figure 5:
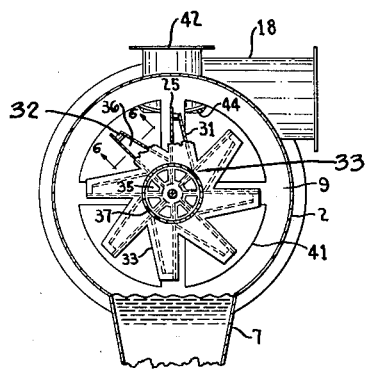
FIG. 5 is a sectional view taken along the lines 5—5 of FIG. 1.
Figure 6:
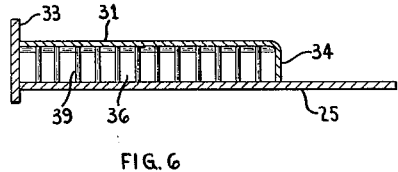
FIG. 6 is a sectional view taken along the lines 6—6 of FIG. 5.

The chamber 13 is provided with a fan 24 mounted coaxially with the open end of the duct 14. The fan 24 may be of any suitable construction, but is preferably constructed according to the disclosure of my aforesaid patent. As best shown in FIGS. 1, 4 and 5, the fan comprises a plurality of substantially radial main blades 25 mounted on a hub 26 keyed to the drive shaft 27 of a motor 28 mounted on a supporting base 29. A plurality of secondary blades 31 extend from the forward face of each main blade 25, at a point spaced radially outwardly from the hub 26, forwardly toward the trailing edge of the preceding main blade. The secondary blades slope forwardly relative to the main blades to provide between them and the main blades an outwardly-convergent space. The outer ends of the secondary blades terminate short of the outer ends of their preceding main blades and are spaced from their preceding main blades to provide an aperture 32. The sides of the secondary blades are joined to the preceding main blades, at the inlet side of the fan 24, by a spider-like end wall 33, and, at the other side of the fan, by the plurality of individual side walls 34. The secondary blades 31 and the space between them and their respective preceding main blades preferably are of a width less than the maximum width of the main blades.

The end wall 33 is provided with a plurality of inlet apertures 35 communicating with the inner end of the space between the main blades 25 and the secondary blades 31. Thus, a complete channelway 36 is formed from the inlet apertures 35 to the radially outer apertures 32 between the secondary blades and the primary blades. A circular collar 37 is mounted on the end wall surrounding the inlet apertures 35, and extends through a circular aperture 38 in the end wall 4 of the casing to provide an inlet for atmospheric air to the channelways 36.

Adjacent its outer discharge end, each of the channelways 36 is provided with a plurality of diffusers or rods 39 of about ⅛ to ¼ inch diameter extending between the surface of the main blade 25 and the secondary blade 31, and spaced apart from each other at a distance of between one-quarter and five-eights of an inch.

The internal baffle 9 adjacent the fan is provided with a plurality of arcuate apertures 41 therein providing communication between the compartments 12 and 13 and located partially outwardly of the generatrix or periphery of the main blades 25 of the fan. Alternatively, the baffle 9 may be omitted and the end of the duct 14 may be supported by a strap or other suitable means, in which case the chambers 12 and 13 will comprise a single, secondary chamber. However, the baffle 9 is advantageous in that it prevents short-circuiting of the gas from the fan and along the casing wall 2, and retains the gas in the fan chamber until a definite circular motion is established. The baffle 9 also confines the matter removed from the gas in the fan chamber 13 to one end of the reservoir and aids in maintaining a relatively clean source of water under chamber 12 for reasons discussed hereinafter.

In approximately the longitudinal center of the compartment 12, the upper portion of the cylindrical wall 2 is provided with a gas outlet member 42 having a depending conduit section 43 extending downwardly into the central compartment 12 and terminating at its lower end in an outwardly and upwardly flared rim 44 which slopes to one side thereof to form a drain 45. The outlet is provided with an external section for connection to a suitable exhaust conduit, not shown.

The reservoir 7 receives water from a source (not shown) via a pipe 46 communicating with a water inlet 47. The desired level of water is maintained by a level control 48 arranged to regulate a valve 49 in the pipe 46. The water reservoir is further provided with a water outlet 50 which communicates by means of a pipe 51 with the intake of a pump 52. The water outlet 50 preferably is located in the upper region of the water reservoir beneath the chamber 12, in which the least amount of pollutant matter is collected, and below the upper level of the water only a distance sufficient to insure a relatively clean supply of water to the pump. A strainer 51a is provided around the inlet to the pipe 51.

The discharge outlet of the pump 52 is connected by a pipe 53 having a flow control valve 54 therein to the water-jacket 18 of the gas inlet 5. The water reservoir is provided with a discharge outlet 55 in the lower region thereof for the removal of accumulated matter therein.

A branch pipe 56 extends from the pipe 53 to adjacent the collar 37 and its discharge end is provided with a spray nozzle 57 directed toward the interior of the collar 37. A valve 58 is provided in the pipe 56 to regulate the spray through the nozzle 57.

In operation, the reservoir water level is established and maintained by means of the water level control 48 which opens the valve 49 to deliver water through the pipe 46 and inlet 47 to provide a level in the reservoir which is preferably slightly higher than the lowermost point of the true cylindrical path of the casing. The motor 28 is set into rotation by power from a source not shown, and drives the fan 24 to induce an inward flow of gas through the gas inlet 5 and around the guide vane 20 to the center of the compartment 11, longitudinally through the duct 14, to the fan 24. The gas discharges from the tips of the fan blades 25 into the compartment 13 and progresses spirally through the apertures 41 in the baffle 9, into the compartment 12. Within the compartment 12, the gas continues in a spiral path between the outer wall of the duct 14 and the wall of the casing 2 and is eventually discharged from the casing through the depending conduit section 43 and gas outlet 6.

During passage of the gas through the inlet member 17 and about the guide vane 20, the water delivered under pressure to the water-jacket 18 through the pipe 53 from the pump 52 is sprayed through the perforations 19 toward the interior of the inlet member 17 to intermix with the gases and wet the solid particles and other pollutants, thereby effecting a cooling of the gases and the condensation of any vapors therein. A substantial portion of such water collects on the outer surface of the guide vane 20 and flows downwardly thereon to drop off at its lowermost point as a water curtain extending across the flow of gas between the guide vane 20 and the upper water surface. As the gases pass through the constricted space between the guide vane and the upper surface of the body of water in the reservoir, the impingment thereof on the water and the rippling effect on the water surface cause further contact, cooling and deposition of pollutant matter from the gases. The gases pass through the water container and continue on between the guide vane 20 and the opposite casing wall to enter the interior of the guide vane, in a generally spiral path, and ultimately pass through the port 15, duct 14, port 16, and into the compartment 13. Water collecting in the interior of the guide vane 20 is drained therefrom through the slot 23 and falls along with water collecting on the outside of the vane as a part of the water curtain across the flowing gases.

The gases enter the duct 14 through the port 15 in a spiralling path concurrent with the spiral path within the chamber 11. However, as the gases pass through the duct 14, the spiral is progressively reduced in pitch so that the gas emerges from the duct in approximately linear flow. From the port 16, the gases are drawn into the spaces between the main blades 25 of the fan 24, and are discharged at suddenly increased radial and tangential velocities to continue a circular path about the chamber 13, impinging on the surface of the water at the lower region thereof, and subsequently passing through the apertures 41 into the chamber 12.

As the fan is rotated, the "forward-curve" pressure characteristics of the secondary blades 31 induce a flow of atmospheric air through the collar 37, the inlet apertures 35, and channelways 36 and radially outwardly through the discharge apertures 32 providing a radial blast of increased velocity to accelerate and to mingle with the gases entering from the duct 14. The diffusers or bars 39 in the ends of the channelways 36 cause a turbulent diffusion of such incoming atmospheric air and a more complete dispersion of the air in the main body of hot gases, thereby violently agitating the gases and, with the radial acceleration thereof, facilitates the throwing of dusts out onto the wall 2.

A water spray or fog is supplied through the pipe 56, valve 58 and nozzle 57 to the gas entering inlet apertures 35 of the channelways in the fan for passage outwardly through the channelways 36 to effect further wetting of the gases, and consequent removal of a portion of the dusts therein. The diffusers or bars 39 are particularly effective for the diffusion of the spray in droplet form, which offers additional surface area on which the dust may be entrapped, as well as imparting an increased radial force to those particles within the gas upon which the droplets impinge.

The agitation of radial acceleration caused by the fan, and particularly by the introduction of atmospheric air through the fan into the hot gases and the wetting effect of the liquid introduced therewith, maintain a centrifuging vortex in the chamber 13, throwing the dust from the hot gases onto the cylindrical wall 2 to pass downwardly therealong to the reservoir.

Upon entering the central chamber 12, the gases continue in a rotating or spiralling motion and are therefore subjected to continued although reduced centrifugal action by the vortex maintained therein, which effects a separation of the entrained water from the gases. Subsequently, deaccelerated gases reach the region of the depending conduit section 43 and are discharged through the outlet 6 and external section 45. Any residual water which may be present in the circulating gases within the central chamber 12, and which may impinge on the outer surfaces of the depending section 43, is prevented from being re-entrained and carried through the lower end of the depending section by the outwardly and upwardly flared rim 44. The sloping rim allows water to accumulate therein and to fall off at its lowest point, or drain 45, which is sufficiently removed from the direct flow of gas into and through the interior of the depending section 43 to allow the water to fall to the reservoir without being entrained in the gas exhausting through the section 43.

Material deposited on and in the surface of the water in the several chambers gradually sinks therethrough to the lower region of the water reservoir, where it remains as a sludge. Such sludge may be removed periodically through the outlet 55, or alternately, if continuous operation is desired, means such as a screw conveyor, drag conveyor, or other suitable sludge extractor may be provided.

The repeated contact of the swirling gases with the surface of the water, which is continually rippled and agitated by the high velocity gases moving therealong, is particularly effective in removing solid and other pollutants from the gases. The guide vane 20 causes the hotter incoming gases to pass through the narrow space between the upper water surface and the vane, thereby causing violent agitation of the water surface and producing intimate contact of the gases with the water and entrainment of a portion of the water therewith which is carried about the exterior of the guide vane to the interior thereof. Entrained water carried to the interior of the guide vane subsequently is thrown out onto the inner walls thereof by centrifugal action, and collects on and runs down the wall surfaces and is drained therefrom through the slot 23 to fall as a curtain across the gases passing beneath the lowest portion of the vane. As the gas flows through the inlet 5, the chamber 11, duct 14, fan 24, compartment 13 and compartment 12 to the outlet 6, it is progressively cleaned, cooled, and reduced in volume.

The sudden radial acceleration imparted to the gases being drawn from the duct 14 and thrown outwardly in the compartment 13 by the fan blades 25 presents any tendency toward a stable condition of suspension of extremely fine matter in the gases passing through the duct, causing an impingement and collection thereof on the walls of the compartment 13. Continuous flushing and removal of the matter from these walls is affected by the collection thereon of water from the gas, including that flowing through the channelways 36, and its passage downwardly along the walls to the water reservoir.

The extension of the internal baffles 8 and 9 downwardly into and below the water reservoir a substantial distance precludes any shortcircuiting of the gases from the inlet compartment 11 to either of the compartments 12 or 13, and further prevents substantial, internal flow of the water in the reservoir under the influence of the gases. The water body below the surface is maintained in a relatively quiescent state, thereby facilitating the settlement of the pollutant material collected therein.

Various changes may be made in the details of the separator as described without sacrificing any of the advantages thereof or departing from the scope of the invention as claimed.

I claim:

1. Apparatus for separating pollutants from gases comprising a vessel, a liquid reservoir extending beneath and in open communication with said vessel, baffle means within the vessel and spaced from the ends thereof to form at least a first and a second chamber in the vessel, the baffle means extending into the liquid reservoir to form, when liquid is in the reservoir, a seal between the chambers, the vessel having a gas inlet communicating with one of the chambers, a guide vane in the first chamber and having the general form of a scroll and located over said reservoir, the gas inlet communicating with the space outwardly of the guide vane, the guide vane being positioned in said first chamber to cause gas introduced into the space outwardly thereof to be guided to a position adjacent the top of and to pass across said reservoir, the first chamber having a gas outlet extending from the center region of the space within the guide vane and communicating with said second chamber, and means in the second chamber for diverting radially gas passing thereinto from the first chamber to establish a gas vortex in the second chamber, said vessel having a clean-gas outlet communicating with the space within said second chamber about which said vortex will be formed.

2. The apparatus of claim 1 in which the gas outlet of the first chamber is a port in the baffle means.

3. Apparatus according to claim 1 in which the gas inlet communicates tangentially with said first chamber.

4. Apparatus according to claim 1 in which the clean-gas outlet is in the upper portion of the vessel, a conduit depends from the clean-gas outlet, and a rim extends outwardly from the lower end of the conduit to deflect moisture collecting on the outer wall of said conduit away from the entrance thereto to inhibit entrainment of such moisture into the gas stream passing through said conduit.

5. The apparatus of claim 1 in which the guide vane is positioned to form with liquid placed in said reservoir a constricted passageway for the flow of gas therebetween.

6. The apparatus of claim 5 in which the guide vane has a drain slot in the lower portion thereof.

7. The apparatus of claim 1 in which said second chamber is spaced from said first chamber and a duct communicates with the gas outlet of said first chamber and terminates within said second chamber.

8. The apparatus of claim 7 including a fan in said second chamber axially opposite the end of the duct for receiving gas therefrom, and said fan comprises the means for diverting said gas radially in said second chamber.

9. The apparatus of claim 8 in which the fan comprises a plurality of main blades and a plurality of secondary blades forming channelways with the main blades, and which includes means for supplying a fluid to the channelways for discharge radially into the second chamber.

10. The apparatus of claim 8 in which the fan comprises a plurality of main blades and a plurality of secondary blades forming channelways between the main blades, and which includes means for supplying a gas to the channelways for discharge radially into the second chamber, and further including means for introducing a liquid into the gas supplied to the channelways.

11. The apparatus of claim 9 including diffusing means in the channelways adjacent the radially outer ends thereof.

12. The apparatus of claim 11 in which the diffusing means comprises a plurality of spaced bars arranged across the channelways.

13. The apparatus of claim 1 in which the liquid reservoir extends beneath said second chamber.

14. The apparatus of claim 1 in which said baffle means comprises a pair of spaced baffles forming between them a third chamber, the clean-gas outlet is in said third chamber, and the baffle between said second and third chambers has an opening opposite the space in said second chamber about which said vortex will be formed for the flow of gas from said space into said third chamber for discharge through said clean-gas outlet.

15. The apparatus of claim 14 in which said reservoir extends beneath all of said chambers.

16. Apparatus for separating pollutants from gases comprising a generally cylindrical vessel, a liquid reservoir extending beneath and along substantially the full length of the vessel and in open communication with said vessel, baffle means within the vessel and spaced from the ends thereof to form at least a first and a second chamber in the vessel, the baffle means extending into the liquid reservoir, to form, when liquid is in the reservoir, a seal between the chambers, the vessel having a gas inlet communicating tangentially with the first chamber and a clean-gas outlet in the upper portion thereof and communicating with the second chamber, the first chamber having a gas outlet therein, a duct communicating with the gas outlet of the first chamber and terminating within the second chamber, and a fan in the second chamber adjacent the discharge end of the duct for diverting radially gas passing from the duct to establish a gas vortex in the second chamber, and a conduit communicating with and extending downwardly from the clean-gas outlet of the vessel, said conduit terminating within the second chamber at a point remote from the end of the duct and adjacent the center of the gas vortex in said second chamber.

17. The apparatus of claim 16 having an outwardly and upwardly flared rim at the lower end of said conduit to deflect moisture collecting on the outer wall of said conduit away from the entrance thereto to inhibit entrainment of such moisture into the gas stream passing through said conduit.

18. The apparatus of claim 17 in which the upper edge of the flared rim slopes downwardly to one side thereof.

19. A method for separating pollutants from a stream of gas comprising introducing a stream of gas to a first centrifuging zone, introducing a liquid in the gas within the first centrifuging zone, withdrawing a stream of gas from the rotational center of the gas within the first centrifuging zone, suddenly accelerating the withdrawn gases radially and tangentially into a second centrifuging zone, introducing a fluid in the gas within the second centrifuging zone, passing the gas spirally from the second centrifuging zone to a third zone, radially and tangentially deaccelerating the gas in the third zone, and discharging a stream of clean gas from the third zone.

20. A method for separating pollutants from a stream of gas according to claim 19 in which the gas withdrawn from the first centrifuging zone is delivered in relatively linear flow to the axial region of the second centrifuging zone prior to radial acceleration therein.

21. A method for separating pollutants from a stream of gas according to claim 19 in which a liquid is introduced into the gas in the second centrifuging zone.

References Cited in the file of this patent

UNITED STATES PATENTS

| 784,748 | Meehan | Mar. 14, 1905 |
| 821,425 | Meehan | May 22, 1906 |
| 1,252,731 | Steward | Jan. 8, 1918 |
| 1,979,189 | Bowers | Oct. 30, 1934 |
| 2,642,950 | Clark et al. | June 23, 1953 |
| 2,760,594 | Browning et al. | Aug. 28, 1956 |
| 2,803,309 | Baker | Aug. 20, 1957 |

FOREIGN PATENTS

| 667,162 | France | June 4, 1929 |

UNITED STATES PATENT OFFICE
CERTIFICATE OF CORRECTION

Patent No. 3,054,244 September 18, 1962

Lloyd J. Hersh

It is hereby certified that error appears in the above numbered patent requiring correction and that the said Letters Patent should read as corrected below.

Column 5, line 75, for "presents" read -- prevents --.

Signed and sealed this 26th day of March 1963.

(SEAL)
Attest:

ESTON G. JOHNSON
Attesting Officer

DAVID L. LADD
Commissioner of Patents